US010210275B2

(12) United States Patent
Yu (10) Patent No.: US 10,210,275 B2
(45) Date of Patent: Feb. 19, 2019

(54) METHOD AND SYSTEM FOR CONTROLLING FOCUS MOVING ON WEBPAGE

(71) Applicant: ZTE CORPORATION, Shenzhen, Guangdong Province (CN)

(72) Inventor: Sheng Yu, Shenzhen (CN)

(73) Assignee: Xi'an Zhongxing New Software Co., Ltd., Xi'an (CN)

( * ) Notice: Subject to any disclaimer, the term of this patent is extended or adjusted under 35 U.S.C. 154(b) by 374 days.

(21) Appl. No.: 14/907,161

(22) PCT Filed: May 16, 2014

(86) PCT No.: PCT/CN2014/077718
§ 371 (c)(1),
(2) Date: Jan. 22, 2016

(87) PCT Pub. No.: WO2014/187280
PCT Pub. Date: Nov. 27, 2014

(65) Prior Publication Data
US 2016/0162501 A1 Jun. 9, 2016

(30) Foreign Application Priority Data

Jul. 24, 2013 (CN) .......................... 2013 1 0314854

(51) Int. Cl.
*G06F 17/30* (2006.01)
(52) U.S. Cl.
CPC .... *G06F 17/3089* (2013.01); *G06F 17/30861* (2013.01)
(58) Field of Classification Search
CPC ............... G06F 17/2247; G06F 17/227; G06F 17/3089; G06F 17/30861
See application file for complete search history.

(56) References Cited

U.S. PATENT DOCUMENTS

2003/0014401 A1 1/2003 Goloshubin et al.
2003/0115167 A1* 6/2003 Sharif .................. G06F 3/0489
(Continued)

FOREIGN PATENT DOCUMENTS

CN 101086696 A 12/2007
CN 101577797 A 11/2009
(Continued)

OTHER PUBLICATIONS

International Search Report (Form PCT/ISA/210) for International Application No. PCT/CN2014/077718.
(Continued)

*Primary Examiner* — Thu V Huynh (57) ABSTRACT

A method and system for controlling focus moving on a webpage is provided, which includes that when an end position of a focus after moving is inconsistent with a determined target position, an moving offset tolerance zone is determined according to an initial position and the end position, and at least one auxiliary position is set in the determined moving offset tolerance zone; the initial position is made to correspond to one or more moving paths generated by the focus moving instruction, and the one or more moving paths are set to comprise a first path from the initial position to the set auxiliary position and a second path from the set auxiliary position to the target position, and the focus is controlled to directly move through the auxiliary position to the target position of the focus. In this way, the focus is avoided from moving to a position inconsistent with the target position, thereby improving accuracy and convenience of the focus moving.

10 Claims, 4 Drawing Sheets

(56) References Cited

U.S. PATENT DOCUMENTS

| | | | |
|---|---|---|---|
| 2004/0090463 A1* | 5/2004 | Celik | G06F 3/0481 |
| | | | 715/767 |
| 2004/0100500 A1* | 5/2004 | Chung | G06F 3/04892 |
| | | | 715/767 |
| 2004/0207647 A1 | 10/2004 | Lundin et al. | |
| 2004/0210851 A1* | 10/2004 | Premchandran | G06F 3/04892 |
| | | | 715/851 |
| 2005/0174327 A1 | 8/2005 | Lee | |
| 2006/0212824 A1 | 9/2006 | Edenbrandt | |
| 2011/0302524 A1* | 12/2011 | Forstall | G06F 17/30905 |
| | | | 715/781 |
| 2013/0191742 A1* | 7/2013 | Iino | G06F 3/0481 |
| | | | 715/704 |

FOREIGN PATENT DOCUMENTS

| | | |
|---|---|---|
| CN | 102520854 A | 6/2012 |
| CN | 103019701 A | 3/2013 |
| EP | 1111497 A1 | 6/2001 |

OTHER PUBLICATIONS

Extended European Search Report, Application No. 14801770.0-1951/3026576 PCT/CN2014077718, dated Jun. 23, 2016.

* cited by examiner

METHOD AND SYSTEM FOR CONTROLLING FOCUS MOVING ON WEBPAGE

TECHNICAL FIELD

The disclosure relates to the field of webpage display and focus control, and in particular, to a method and system for controlling focus moving on a webpage.

BACKGROUND

A Web page, also called webpage, is a webpage in which the content is formatted and displayed in a form of tags using a Hypertext Markup Language (HTML). On most of browsers, Web pages support the use of JavaScript to perform operation on the content of the page. It is one of Internet content displaying manners which are widely used currently, and abundant contents can be shown on a number of devices such as personal computers (PCs), mobile phones, tablet PCs, set-top boxes and televisions through a browser. The user can browse content on an Internet through a pointer or non-pointer input operation.

However, when the non-pointer input operation is used to browse content on the Internet, for example, a operation of focus (an object currently operated) moving is performed by direction keys on devices such as a touch-tone phone, a set-top box, a television, a dedicated terminal and a PC to browse content on the Internet, the case where an end position and a target position of a focus are inconsistent always occurs, and this leads to a fact that a user needs to press one or more keys many times to make the focus fall to the target position, which reduces accuracy and convenience of the focus moving.

SUMMARY

A method and system for controlling focus moving on a webpage are provided in the embodiments of the disclosure, so as to at least improve accuracy and convenience of the focus moving.

A method for controlling focus moving on a webpage is provided in the embodiments of the disclosure, the method includes:

when a focus moving instruction is detected, determining an initial position and a target position of the focus moving, and controlling a focus to move from the determined initial position; when an end position of the focus moving is inconsistent with the determined target position, determining a moving offset tolerance zone according to the initial position and the end position, and setting at least one auxiliary position in the determined moving offset tolerance zone; and making the initial position correspond to one or more moving paths generated by the focus moving instruction, and setting the one or more moving paths to include a first path from the initial position to the set at least one auxiliary position and a second path from the set at least one auxiliary position to the target position.

In an example embodiment, determining the moving offset tolerance zone according to the initial position and the end position includes: acquiring, according to the initial position and the end position, a distance from the initial position to the end position; and determining one circular sector area with a preset central angle, which takes the initial position as a center of a circle and takes the acquired distance as a radius, to be the moving offset tolerance zone.

In an example embodiment, after making the initial position correspond to one or more moving paths generated by the focus moving instruction, and setting the one or more moving paths to include the first path from the initial position to the set at least one auxiliary position and the second path from the set at least one auxiliary position to the target position, the method further includes: performing mapping to the initial position, the target position, the first path and the second path and storing a result of a mapping operation.

In an example embodiment, after performing mapping to the initial position, the target position and storing the result of the mapping operation, the first path and the second path, the method further includes: when a focus moving instruction is detected, determining an initial position and a target position of the focus moving; correspondingly searching for a stored path according to the determined initial position and the determined target position; and when the stored path is searched, controlling the focus to move, according to the searched path, from the determined initial position to the target position.

In an example embodiment, setting the at least one auxiliary position in the determined moving offset tolerance zone includes: setting the at least one auxiliary position in the determined moving offset tolerance zone; and setting an attribute of transparency or the same color as a current webpage for the set at least one auxiliary position.

A system for controlling focus moving on a webpage is further provided in the embodiments of the disclosure, the system includes:

a control component, configured to, when a focus moving instruction is detected, determine an initial position and a target position of the focus moving, and control a focus to move from the determined initial position; a processing component, configured to, when an end position of the focus moving is inconsistent with the determined target position, determine a moving offset tolerance zone according to the initial position and the end position, set at least one auxiliary position in the determined moving offset tolerance zone; and make the initial position correspond to one or more moving paths generated by the focus moving instruction, and set the one or more moving paths to include a first path from the initial position to the set at least one auxiliary position and a second path from the set at least one auxiliary position to the target position.

In an example embodiment, the processing component is further configured to acquire, according to the initial position and the end position, a distance from the initial position to the end position; and determine one circular sector area with a preset central angle, which takes the initial position as a center of a circle and takes the acquired distance as a radius, to be the moving offset tolerance zone.

In an example embodiment, the system further includes: a storage component, configured to perform mapping to the initial position, the target position, the first path and the second path and storing a result of a mapping operation.

In an example embodiment, the processing component is further configured to, when a focus moving instruction is detected, determine an initial position and a target position of the focus moving; and correspondingly search for a stored path according to the determined initial position and the determined target position; and the control component is further configured to, when the stored path is searched, control the focus to move, according to the searched path, from the determined initial position to the target position.

In an example embodiment, the processing component is further configured to set the at least one auxiliary position in the determined moving offset tolerance zone; and set an attribute of transparency or the same color as a current webpage for the set at least one auxiliary position.

For the related art, according to the embodiments of the disclosure, when an end position of a focus after moving is inconsistent with a determined target position, an moving offset tolerance zone is determined according to an initial position and the end position, and at least one auxiliary position is set in the determined moving offset tolerance zone; the initial position is made to correspond to one or more moving paths generated by the focus moving instruction, and the one or more moving paths are set to include a first path from the initial position to the set auxiliary position and a second path from the set auxiliary position to the target position, and the focus is controlled to directly move through the auxiliary position to the target position of the focus. In this way, the focus is avoided from moving to a position inconsistent with the target position, thereby improving accuracy and convenience of focus moving.

The achievement of the object, the functional features and the advantages of the present disclosure and are described below with reference to accompanying drawings when read in conjunction with embodiments.

DETAILED DESCRIPTION OF THE EMBODIMENTS

It should be appreciated that the embodiments described herein are merely illustrative of the present disclosure but not to be construed as limiting the present disclosure.

Figure 1:
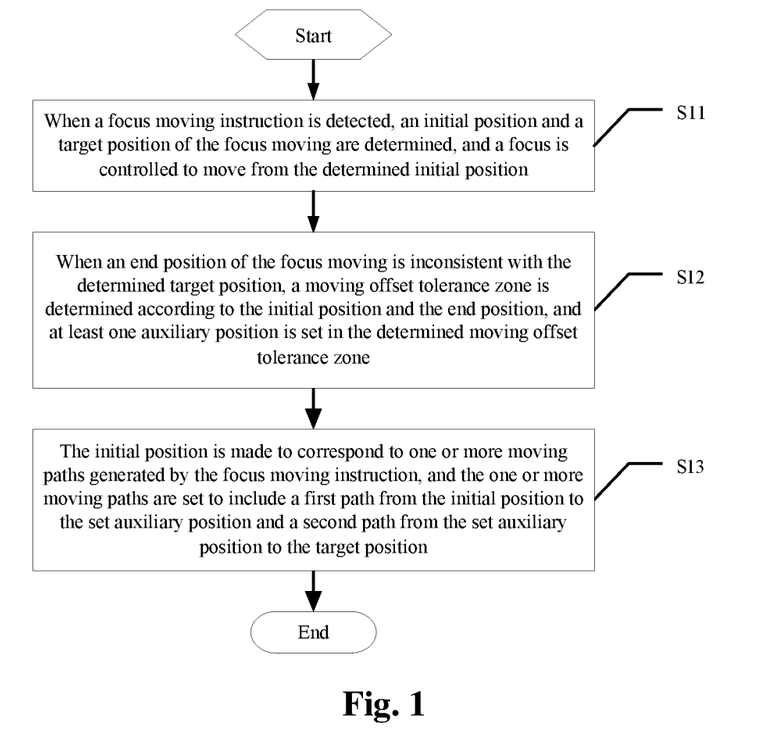
FIG. 1 is a specific flowchart of a method for controlling focus moving on a webpage according to a first embodiment of the disclosure.
Figure 2:
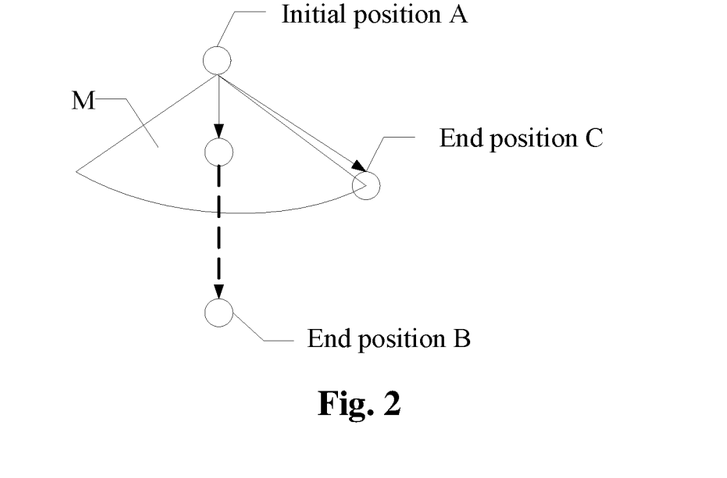
FIG. 2 is a schematic diagram of focus moving on a webpage

As shown in FIGS. 1 and 2, FIG. 1 is a specific flowchart of a method for controlling focus moving on a webpage according to a first embodiment of the present disclosure; and FIG. 2 is a schematic diagram of focus moving on a webpage.

It is emphasized that the flowchart shown in FIG. 1 is merely an example embodiment, it should be apparent to those skilled in the art that any embodiment constructed around the conception of the present disclosure should not depart from the scope covered by the following technical solution:

when a focus moving instruction is detected, determining an initial position and a target position of the focus moving, and controlling a focus to move from the determined initial position; when an end position of the focus moving is inconsistent with the determined target position, determining a moving offset tolerance zone according to the initial position and the end position, and setting at least one auxiliary position in the determined moving offset tolerance zone; and making the initial position correspond to one or more moving paths generated by the focus moving instruction, and setting the one or more moving paths to include a first path from the initial position to the set auxiliary position and a second path from the set auxiliary position to the target position.

The specific steps for gradually realizing the control of focus moving on the webpage in the embodiments are as follows:

Step S11: when a focus moving instruction is detected, an initial position and a target position of the focus moving are determined, and the focus is controlled to move from the determined initial position.

In an implementation of the embodiment of the present disclosure, when a user needs to browse webpage content displayed on a browser of a touch-tone device, the user triggers the focus moving instruction by pressing one or more keys. Each browser has a built-in webpage focus moving algorithm, when the focus moving instruction is detected, the initial position and the target position of the focus moving are determined, the browser moves the focus according to a moving path generated by the built-in webpage focus moving algorithm. For example, taking a minimum radius algorithm as an example, the minimum radius algorithm is a relatively simple browser focus searching algorithm, when the user sends, by the touch-tone device, a focus moving instruction of downward, upward, leftward or rightward, the browser only searches a nearest point in a range from plus 45 degrees to minus 45 degrees of a direction in which the user presses one or more keys, corresponding to the current focus on the webpage, to make the nearest point as the target position of the focus, and moves the focus to a position at which the nearest point locates. The touch-tone device can be an electronic device which can be controlled by pressing one or more keys, such as a touch-tone phone, a set-top box, a TV or a dedicated terminal.

Step S12: when an end position of the focus moving is inconsistent with the determined target position, a moving offset tolerance zone is determined according to the initial position and the end position, and at least one auxiliary position is set in the determined moving offset tolerance zone.

It is judged whether the current focus is abnormal when the focus moves according to the moving path generated by the built-in webpage focus moving algorithm. That is, it is judged whether the end position of the focus moving is consistent with the determined target position, when the end position of the focus moving is inconsistent with the determined target position, a moving offset tolerance zone is determined according to the initial position and the end position, and at least one auxiliary position is set in the determined moving offset tolerance zone. The method for determining the moving offset tolerance zone is to acquire, according to the initial position and the end position, a distance from the initial position to the end position, so as to determine one circular sector area with a preset central angle, which takes the initial position as a center of a circle and takes the acquired distance as a radius, to be the moving offset tolerance zone. For example, taking the minimum radius algorithm as an example, the distance from the initial position to the end position is acquired according to the initial position and the end position, so as to determine a circular sector area formed according to a central angle of plus 45 degrees and minus 45 degrees along the direction from the initial position to the target position by taking the initial position as a center of a circle and taking the acquired distance as a radius, and at least one auxiliary position is set in the determined moving offset tolerance zone, that is, the distance from the auxiliary position set at any position in the offset tolerance zone to the initial position is less than the distance from the end position to the initial position. When the focus is moved according to the received focus moving instruction, it is ensured that the focus moves from the initial position to the set auxiliary position. In other embodiments of the present disclosure, the method for determining the moving offset tolerance zone is to acquire, according to the initial position and the end position, a distance from the initial position to the end position, and a circular zone taking the initial position as a center of a circle and taking the acquired distance as a radius is determined to be the moving offset tolerance zone. By means of the determined moving offset tolerance zone, the distance from the auxiliary position set in the zone to the initial position is less than the distance from the end position to the initial position, so that the focus moves from the initial position to the set auxiliary position, so as to move to the target position via the auxiliary position.

Step S13: the initial position is made to correspond to one or more moving paths generated by the focus moving instruction, and the one or more moving paths are set to include a first path from the initial position to the set auxiliary position and a second path from the set auxiliary position to the target position.

In an implementation of the embodiment of the present disclosure, if one auxiliary position is set in the determined moving offset tolerance zone, the moving paths of the focus moving instruction corresponding to the initial position is configured to include the first path from the initial position to the set auxiliary position and the second path from the set auxiliary position to the target position; if two auxiliary positions including a first auxiliary position and a second auxiliary position are set in the determined moving offset tolerance zone, the moving paths of the focus moving instruction corresponding to the initial position is configured to include the first path from the initial position to the set auxiliary position, the second path from the set auxiliary position to the target position and a third path from a first auxiliary position to a second auxiliary position. For example, see FIG. 2, when a focus moving instruction is detected, it is determined that an initial position of the focus moving is A, and a target position is B. The browser moves the focus according to a moving path generated by the built-in webpage focus moving algorithm, the focus is moved from the initial position A to a position C. When an end position of the focus moving is inconsistent with the determined target position, a distance from the initial position A to the end position C is acquired, and a circular sector area formed according to a central angle of plus 45 degrees and minus 45 degrees along the direction from the initial position A to the target position B by taking the initial position as a center of a circle and taking the acquired distance as a radius is determined to the moving offset tolerance zone M, and at least one auxiliary position D is set in the determined moving offset tolerance zone M. The moving paths of the focus moving instruction corresponding to the initial position A is configured to include the first path from the initial position A to the set auxiliary position D and the second path from the set auxiliary position D to the target position B. When an end position of a focus after moving is inconsistent with the determined target position, an moving offset tolerance zone is determined according to an initial position and the end position, and at least one auxiliary position is set in the determined moving offset tolerance zone; moving paths of a focus moving instruction corresponding to the initial position is configured to include a first path from the initial position to the set auxiliary position and a second path from the set auxiliary position to the target position, and the focus is controlled to directly move through the auxiliary position to the target position of the focus, so that the focus is avoided from moving to a position inconsistent with the target position, thereby improving accuracy and convenience of focus moving.

Furthermore, an attribute of transparency or the same color as the current webpage is set for the set auxiliary position. The auxiliary position is configured to have an attribute of transparency or the same color as the current webpage, so that on the basis that the focus moving is more accurate, the aesthetics of the webpage will not be influenced, and interference does not occur on the content of the webpage browsed.

Figure 3:
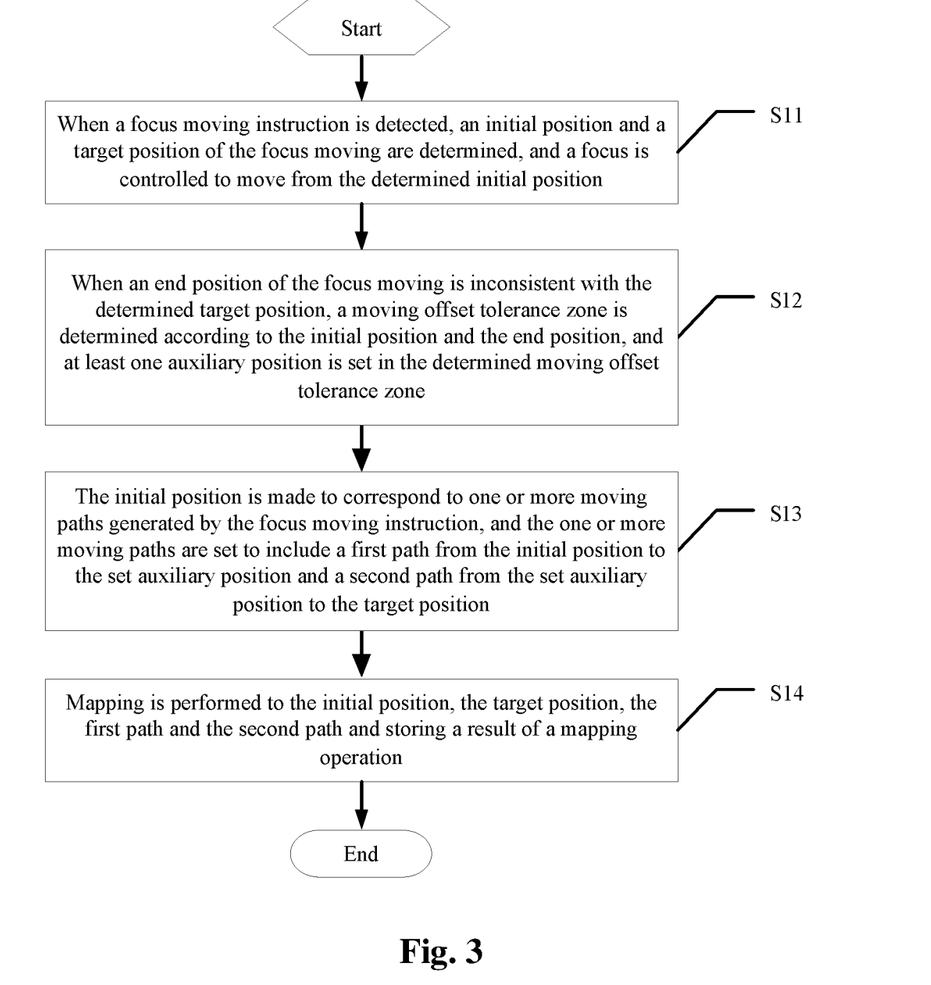
FIG. 3 is a specific flowchart of a method for controlling focus moving on a webpage according to a second embodiment of the disclosure.

As shown in FIG. 3, it is a specific flowchart of a method for controlling focus moving on a webpage according to a second embodiment of the present disclosure.

On the basis of the above-mentioned first embodiment, after step S13, the method further includes:

Step S14, an operation of mapping is performed to the initial position, the target position, the first path and the second path and storing a result of a mapping operation.

The operation of mapping is performed to the initial position, the target position, the first path and the second path and storing the result of the mapping operation, so as to provide a basis for determining, when a focus moving instruction is detected next time, whether an initial position and a target position of the focus moving corresponding to the focus moving instruction detected next is consistent with the stored initial position and target position.

Figure 4:
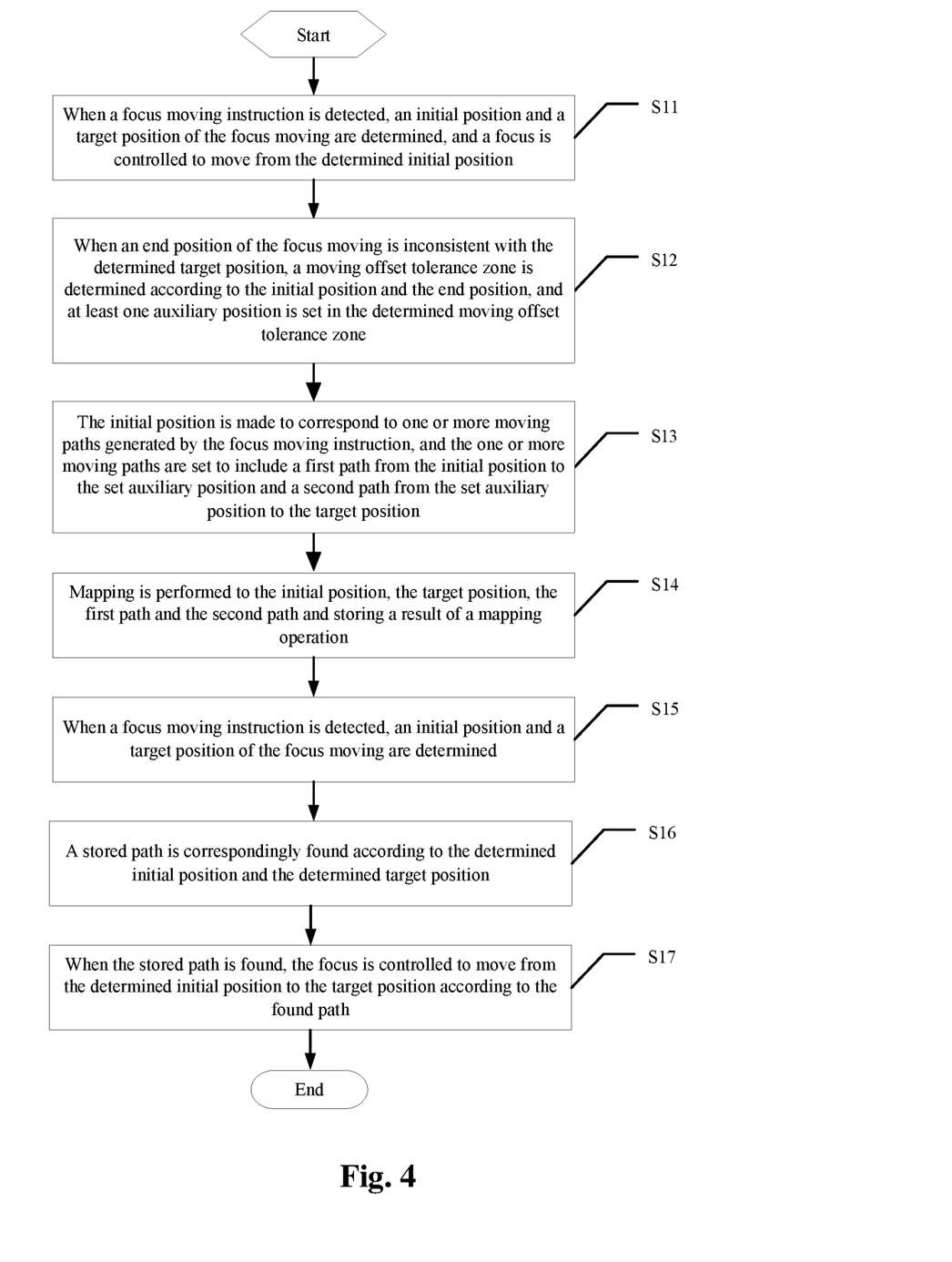
FIG. 4 is a specific flowchart of a method for controlling focus moving on a webpage according to a third embodiment of the disclosure.

As shown in FIG. 4, it is a specific flowchart of a method for controlling focus moving on a webpage according to a third embodiment of the present disclosure.

On the basis of the above-mentioned second embodiment, after step S14, the method further includes:

step S15, when a focus moving instruction is detected, an initial position and a target position of the focus moving are determined.

When a user needs to browse webpage content displayed on a browser of a touch-tone device, the user triggers a focus moving instruction by pressing one or more keys. When the focus moving instruction is detected, the initial position and the target position of the focus moving are determined.

Step S16, a stored path is correspondingly searched according to the determined initial position and the determined target position.

The determined initial position of the focus moving is compared with the stored initial position of the focus moving, the manner for performing comparison may be a manner for determining whether a coordinate of the determined initial position in the whole webpage with respect to a preset reference point is consistent with a coordinate of the stored initial position in the whole webpage with respect to the preset reference point, and also may be any applicable manner that can distinguish whether the determined initial position is consistent with the stored initial position and can distinguish whether the determined target position is consistent with the stored target position.

Step S17, when the stored path is searched, the focus is controlled to move from the determined initial position to the target position according to the searched path.

Specifically, when the coordinate of the determined initial position in the whole webpage with respect to the preset reference point is consistent with the coordinate of the stored initial position in the whole webpage with respect to the preset reference point and when the coordinate of the determined target position in the whole webpage with respect to the preset reference point is consistent with the coordinate of the stored target position in the whole webpage with respect to the preset reference point. That is, the determined initial position is consistent with the stored initial position, and the determined target position is consistent with the stored target position. Furthermore, a path, to which the stored initial position and the stored target position are mapped, is searched, and the focus is controlled to move from the determined initial position to the target position according to the searched path.

The determined initial position is compared with the stored initial position and the determined target position is compared with the stored target position, when it is determined that the determined initial position is consistent with the stored initial position and the determined target position is consistent with the stored target position, a path, to which the stored initial position and target position are mapped, is searched, and the focus is controlled to move from the determined initial position to the target position according to the searched path. In this way, the focus is avoided from moving to a position inconsistent with the target position, thereby improving accuracy and convenience of focus moving.

Figure 5:
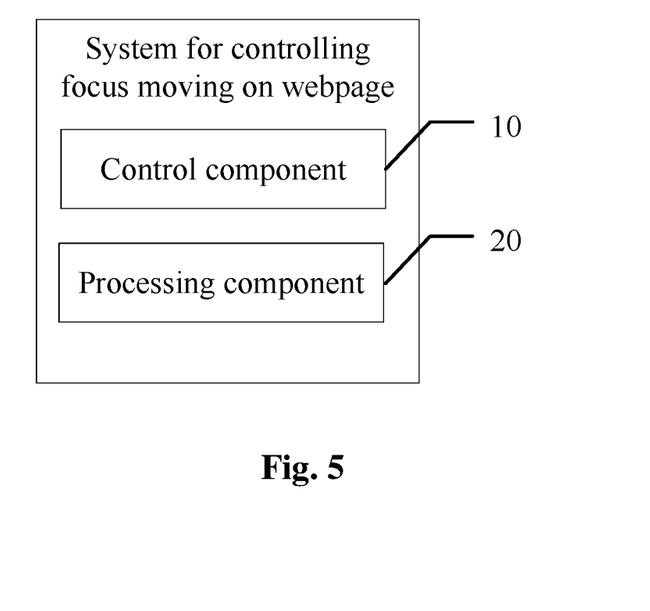
FIG. 5 is a specific architecture diagram of a system for controlling focus moving on a webpage according to a first embodiment of the disclosure.

As shown in FIGS. 2 and 5, FIG. 2 is a schematic diagram of focus moving on a webpage, and FIG. 5 is an specific architecture diagram of a system for controlling focus moving on a webpage according to a first embodiment of the present disclosure. The system includes a control component 10 and a processing component 20.

The control component 10 is configured to, when a focus moving instruction is detected, determine an initial position and a target position of the focus moving, and control a focus to move from the determined initial position.

Specifically, when a user needs to browse webpage content displayed on a browser of a touch-tone device, the user triggers a focus moving instruction by pressing one or more keys. Each browser has a built-in webpage focus moving algorithm, when the focus moving instruction is detected, the control component 10 determines the initial position and the target position of the focus moving and controls the focus to move according to a moving path generated by the built-in webpage focus moving algorithm. For example, taking an minimum radius algorithm as an example, the minimum radius algorithm is a relatively simple browser focus searching algorithm, when the user sends, by the touch-tone device, a focus moving instruction of downward, upward, leftward or rightward, only a nearest point in a range from plus 45 degrees to minus 45 degrees of a direction in which the user presses the one or more keys, corresponding to the current focus on the webpage is searched, to make the nearest point as the target position of the focus, and moves the focus to a position at which the nearest point locates. The push-button device can be an electronic device which can be controlled by pressing one or more keys, such as a touch-tone phone, a set-top box, a TV or a dedicated terminal.

The processing component 20 is configured to, when an end position of the focus moving is inconsistent with the determined target position, determine a moving offset tolerance zone according to the initial position and the end position and set at least one auxiliary position in the determined moving offset tolerance zone; and make the initial position correspond to one or more moving paths generated by the focus moving instruction, and set the one or more moving paths to include a first path from the initial position to the set auxiliary position and a second path from the set auxiliary position to the target position.

Specifically, it is judged whether current focus is abnormal when the focus moves according to the moving path generated by the built-in webpage focus moving algorithm. That is, it is judged whether the end position of the focus moving is consistent with the determined target position, when the end position of the focus moving is inconsistent with the determined target position, a moving offset tolerance zone is determined according to the initial position and the end position, and at least one auxiliary position is set in the determined moving offset tolerance zone. The method for the processing component 20 to determine the moving offset tolerance zone is to acquire, according to the initial position and the end position, a distance from the initial position to the end position, so as to determine one circular sector area with a preset central angle, which takes the initial position as a center of a circle and takes the acquired distance as a radius, to be the moving offset tolerance zone. For example, taking the minimum radius algorithm as an example, the processing component 20 acquires the distance from the initial position to the end position according to the initial position and the end position, so as to determine a circular sector area formed according to a central angle of plus 45 degrees and minus 45 degrees along the direction from the initial position to the target position by taking the initial position as a center of a circle and taking the acquired distance as a radius, and the processing component 20 sets at least one auxiliary position in the determined moving offset tolerance zone, that is, the distance from the auxiliary position set at any position in the offset tolerance zone to the initial position is less than the distance from the end position to the initial position. When the focus is moved according to the received focus moving instruction, it is ensured that the focus moves from the initial position to the set auxiliary position. In other embodiments of the present disclosure, the method for the processing component 20 to determine the moving offset tolerance zone is to acquire, according to the initial position and the end position, a distance from the initial position to the end position, and a circular region taking the initial position as a center of a circle and taking the acquired distance as a radius is determined to be the moving offset tolerance zone. By means of the determined moving offset tolerance zone, the distance from the auxiliary position set in the zone to the initial position is less than the distance from the end position to the initial position, so that the focus moves from the initial position to the set auxiliary position, so as to move to the target position via the auxiliary position, so that the focus is avoided from moving to a position inconsistent with the target position, thereby improving accuracy and convenience of focus moving.

Furthermore, if one auxiliary position is set in the determined moving offset tolerance zone, the processing component 20 configures the moving paths of the focus moving instruction corresponding to the initial position to include the first path from the initial position to the set auxiliary position and the second path from the set auxiliary position to the target position; if two auxiliary positions including a first auxiliary position and a second auxiliary position are set in the determined moving offset tolerance zone, the processing component 20 configures the moving paths of the focus moving instruction corresponding to the initial position to include the first path from the initial position to the set auxiliary position, the second path from the set auxiliary position to the target position and a third path from a first auxiliary position to a second auxiliary position. For example, see FIG. 2, when a focus moving instruction is detected, the control component 10 determines that an initial position of the focus moving is A and a target position is B and controls the focus to move according to a moving path generated by the built-in webpage focus moving algorithm, the focus is moved from the initial position A to a position C. When an end position of the focus moving is inconsistent with the determined target position, processing component 20 acquires a distance from the initial position A to the end position C, and a circular sector area formed according to a central angle of plus 45 degrees and minus 45 degrees along the direction from the initial position A to the target position B by taking the initial position as a center of a circle and taking the acquired distance as a radius is determined to the moving offset tolerance zone M, and at least one auxiliary position D is set in the determined moving offset tolerance zone M. The moving paths of the focus moving instruction corresponding to the initial position A is configured to include the first path from the initial position A to the set auxiliary position D and the second path from the set auxiliary position D to the target position B. When an end position of a focus after moving is inconsistent with the determined target position, the processing component 20 determines an moving offset tolerance zone according to an initial position and the end position, and at least one auxiliary position is set in the determined moving offset tolerance zone; the processing component 20 configure moving paths of a focus moving instruction corresponding to the initial position to include a first path from the initial position to the set auxiliary position and a second path from the set auxiliary position to the target position, and the control component 10 controls the focus is to directly move through the auxiliary position to the target position of the focus, so that the focus is avoided from moving to a position inconsistent with the target position, thereby improving accuracy and convenience of focus moving.

Furthermore, the processing component 20 is further configured to set an attribute of transparency or the same color as the current webpage for the set auxiliary position. The processing component 20 configures the auxiliary position to have an attribute of transparency or the same color as the current webpage, so that on the basis that the focus moving is more accurate, the aesthetics of the webpage will not be influenced, and interference does not occur on the content of the webpage browsed.

Figure 6:
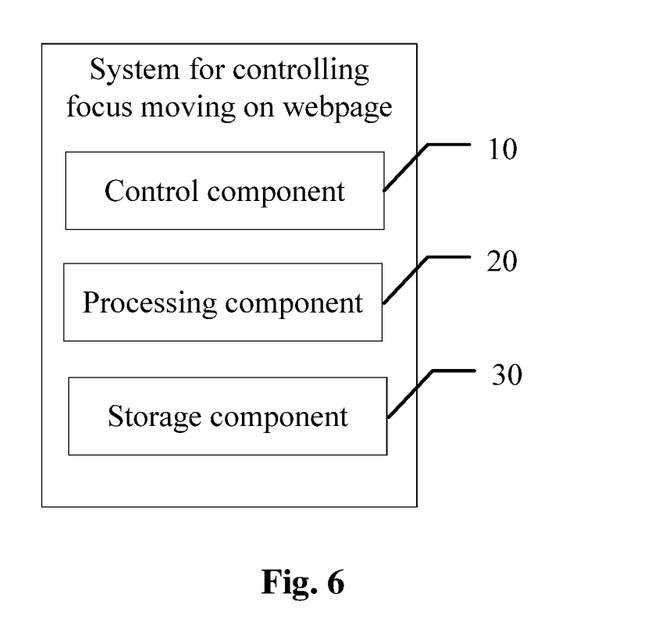
FIG. 6 is a specific architecture diagram of a system for controlling focus moving on a webpage according to a second embodiment of the disclosure.

As shown in FIG. 6, it is an specific architecture diagram of a system for controlling focus moving on a webpage according to a second embodiment of the present disclosure. The system further includes a storage component 30.

The storage component 30 is configured to perform mapping to the initial position, the target position, the first path and the second path and storing a result of a mapping operation.

The storage component 30 performs mapping to the initial position, the target position, the first path and the second path and storing the result of the mapping operation, so as to provide a basis for determining, when a focus moving instruction is detected next time, whether an initial position and a target position of the focus moving corresponding to the focus moving instruction detected next is consistent with the stored initial position and target position.

Furthermore, the processing component 20 is further configured to, when the focus moving instruction is detected, determine the initial position and the target position of the focus moving, and correspondingly search for a stored path according to the determined initial position and the determined target position.

Specifically, when a user needs to browse the webpage content displayed on the browser of a touch-tone device, the user triggers a focus moving instruction by pressing one or more keys. When the focus moving instruction is detected, the processing component 20 determines the initial position and the target position of the focus moving.

The processing component 20 compares the determined initial position of the focus moving with the stored initial position of the focus moving, the manner for the processing component 20 to perform comparison may be a manner for determining whether a coordinate of the determined initial position in the whole webpage with respect to a preset reference point is consistent with a coordinate of the stored initial position in the whole webpage with respect to the preset reference point, and also may be any applicable manner that can distinguish whether the determined initial position is consistent with the stored initial position and can distinguish whether the determined target position is consistent with the stored target position.

The control component 10 is further configured to, when the stored path is searched, control the focus to move from the determined initial position to the target position according to the searched path.

Specifically, when the coordinate of the initial position determined by the processing component 20 in the whole webpage with respect to the preset reference point is consistent with the coordinate of the stored initial position in the whole webpage with respect to the preset reference point and when the coordinate of the determined target position in the whole webpage with respect to the preset reference point is consistent with the coordinate of the stored target position in the whole webpage with respect to the preset reference point. That is, the determined initial position is consistent with the stored initial position, and the determined target position is consistent with the stored target position. Furthermore, the processing component 20 searches for a path to which the stored initial position and the stored target position are mapped, and the control component 10 controls the focus to move from the determined initial position to the target position according to the searched path.

The processing component 20 compares the determined initial position with the initial position stored by the storage component 30 and compares the determined target position with the target position stored by the storage component 30, when it is determined that the determined initial position is consistent with the stored initial position and the determined target position is consistent with the stored target position, the processing component 20 searches for a path, to which the stored initial position and the stored target position are mapped, and the control component 10 controls the focus to move from the determined initial position to the target position according to the searched path. In this way, the focus is avoided from moving to a position inconsistent with the target position, thereby improving accuracy and convenience of focus moving.

Above description is only to illustrate the example embodiments but not to limit the scope of the present disclosure; and the direct or indirect application of any equivalent structure or equivalent flow devised as defined by the description and accompanying drawings of the present disclosure to other related fields should also fall within the protection scope of the present disclosure.

INDUSTRIAL APPLICABILITY

The technical solutions provided in the embodiments of the present disclosure, which can be applied to the field of webpage display and focus control, can prevent a focus from moving to a position inconsistent with a target position, thereby improving accuracy and convenience of focus moving.

What is claimed is:

1. A method for controlling focus moving on a webpage, comprising:
when a focus moving instruction is detected, determining, by a touch-tone device, an initial position and a target position of the focus moving, and controlling, by the touch-tone device, a focus to move from the determined initial position to an end position;
when the end position of the focus moving is inconsistent with the determined target position, determining, by the touch-tone device, a moving offset tolerance zone according to the initial position and the end position, and setting, by the touch-tone device, at least one auxiliary position in the determined moving offset tolerance zone; and
making, by the touch-tone device, the initial position correspond to moving paths generated by the focus moving instruction, and setting, by the touch-tone device, the moving paths to comprise a first path from the initial position to the set at least one auxiliary position and a second path from the set at least one auxiliary position to the target position.

2. The method as claimed in claim 1, wherein determining, by the touch-tone device, the moving offset tolerance zone according to the initial position and the end position comprises:
acquiring, by the touch-tone device, according to the initial position and the end position, a distance from the initial position to the end position; and
determining, by the touch-tone device, one circular sector area with a preset central angle, which takes the initial position as a center of a circle and takes the acquired distance as a radius, to be the moving offset tolerance zone.

3. The method as claimed in claim 1, wherein after making, by the touch-tone device, the initial position correspond to the moving paths generated by the focus moving instruction, and setting, by the touch-tone device, the moving paths to comprise the first path from the initial position to the set at least one auxiliary position and the second path from the set at least one auxiliary position to the target position, the method further comprises:
performing, by the touch-tone device, mapping to the initial position, the target position, the first path and the second path and storing a result of a mapping operation.

4. The method as claimed in claim 3, wherein after performing, by the touch-tone device, mapping to the initial position, the target position, the first path and the second path and storing the result of the mapping operation, the method further comprises:
when a focus moving instruction is detected, determining, by the touch-tone device, an initial position and a target position of the focus moving;
correspondingly searching, by the touch-tone device, for a stored path according to the determined initial position and the determined target position; and
when the stored path is searched, controlling, by the touch-tone device, the focus to move, according to the searched path, from the determined initial position to the target position.

5. The method as claimed in claim 1, wherein setting, by the touch-tone device, the at least one auxiliary position in the determined moving offset tolerance zone comprises:
setting, by the touch-tone device, the at least one auxiliary position in the determined moving offset tolerance zone; and
setting, by the touch-tone device, an attribute of transparency or same color as a current webpage for the set at least one auxiliary position.

6. A touch-tone device, comprises a hardware processor and a storage, wherein the hardware processor is configured to execute program components stored on the storage, the program components comprising:
a control component, configured to, when a focus moving instruction is detected, determine an initial position and a target position of the focus moving, and control a focus to move from the determined initial position to an end position;
a processing component, configured to, when the end position of the focus moving is inconsistent with the determined target position, determine a moving offset tolerance zone according to the initial position and the end position, set at least one auxiliary position in the determined moving offset tolerance zone; and make the initial position correspond to moving paths generated by the focus moving instruction, and set the moving paths to comprise a first path from the initial position to the set at least one auxiliary position and a second path from the set at least one auxiliary position to the target position.

7. The device as claimed in claim 6, wherein
the processing component is further configured to acquire, according to the initial position and the end position, a distance from the initial position to the end position; and
determine one circular sector area with a preset central angle, which takes the initial position as a center of a circle and takes the acquired distance as a radius, to be the moving offset tolerance zone.

8. The device as claimed in claim 6, wherein:
the storage is configured to perform mapping to the initial position, the target position, the first path and the second path and storing a result of a mapping operation.

9. The device as claimed in claim 8, wherein
the processing component is further configured to, when a focus moving instruction is detected, determine an initial position and a target position of the focus moving; and correspondingly search for a stored path according to the determined initial position and the determined target position; and
the control component is further configured to, when the stored path is searched, control the focus to move, according to the searched path, from the determined initial position to the target position.

10. The device as claimed in claim 6, wherein,
the processing component is further configured to set the at least one auxiliary position in the determined moving offset tolerance zone, and
set an attribute of transparency or same color as a current webpage for the set at least one auxiliary position.

* * * * *